United States Patent Office 2,819,288
Patented Jan. 7, 1958

2,819,288
POLYHYDROXY-β-ACYLAMINOANTHRA-
QUINONES

Paul Grossmann, Binningen, Switzerland, assignor to Ciba Limited, Basel, Switzerland, a Swiss firm No Drawing. Application March 19, 1956
Serial No. 572,225

Claims priority, application Switzerland April 1, 1955

6 Claims. (Cl. 260—377)

This invention provides as valuable new dyestuffs polyhydroxyanthraquinones which contain a single anthraquinone nucleus and in at least one β-position of the anthraquinone nucleus a primary amino group acylated by the radical of a monocarboxylic acid, advantageously a monocarboxylic acid of low to medium molecular weight.

The invention also provides a process for the manufacture of the aforesaid polyhydroxy-β-acylaminoanthraquinones, wherein a polyhydroxyanthraquinone, which contains a single anthraquinone nucleus and in at least one β-position of the anthraquinone nucleus a primary amino group, is acylated with an agent capable of introducing the radical of a monocarboxylic acid, and advantageously of a monocarboxylic acid of low to medium molecular weight.

As polyhydroxy-β-aminoanthraquinones there may be used in the process of this invention those which contain at least 2, and, if desired, more than 2, for example, 3 or 4, hydroxyl groups, and are advantageously free from groups imparting solubility in water. They many contain further simple substituents. It is, however, of advantage to use starting materials which are free from substituents other than the hydroxyl and amino groups. Of special interest are those polyhydroxy-aminoanthraquinones which contain the hydroxyl groups in α-positions of the anthraquinone nucleus. As examples there may be mentioned, 1:4-dihydroxy-2-aminoanthraquinone, 1:4:5-trihydroxy-2-aminoanthraquinone, 1:5:8-trihydroxy-2-aminoanthraquinone and 1:4:5:8-tetrahydroxy-2-aminoanthraquinone.

As acylating agents there are used in the process of this invention reactive functional derivatives of monocarboxylic acids, which are preferably of low to medium molecular weight, especially those containing 2–12 carbon atoms. Of particular interest are acylating agents which are capable of introducing a radical of the formula

in which n is a whole number from 1 to 11, for example, the radical of acetic acid, propionic acid, butyric acid or isobutyric acid, caproic acid or lauric acid. However, acylating agents, which are functional derivatives of cyclic carboxylic acids such as benzoic acid or hexahydrobenzoic acid, also give very good results. As reactive functional derivatives there come into consideration mainly halides, and especially chlorides, of the acids. Acid anhydrides may also be used for the acylation.

The acylation may be carried out by methods in themselves known, for example, in an inert organic solvent, such as nitrobenzene or chlorobenzene, and advantageously with the addition of an acid-binding agent, for example, a tertiary base such as pyridine or dimethylaniline, and is advantageously carried out at a raised temperature.

The new polyhydroxy-β-acylaminoanthraquinones contain a single anthraquinone nucleus and in at least one β-position an amino group acylated by the radical of a monocarboxylic acid. Thus, polyhydroxy-β-acylaminoanthraquinones, which contain the acyl radical of a carboxylic acid of low to medium molecular weight, are excellently suited, especially after being suitably pasted, if desired, in conjunction with reprecipitation, for example, from sulfuric acid, for dyeing or printing shaped structures and especially fibers of polyesters, for example, polyethylene terephthalate, which are marketed under the names "Terylene" and "Dacron." There are obtained by the usual dyeing methods, for example, from a dye liquor, which contains a dispersion of the dyestuff and advantageously a dispersing agent, at temperatures in the vicinity of 100° C., if desired, with the addition of a swelling agent or at a temperature above 100° C. under superatmospheric pressure, dyeings of pure and generally strong orange to blue-red tints depending on the polyhydroxy-acylaminoanthraquinone used, and which dyeings are distinguished by their good fastness properties. Furthermore, the new dyestuffs can be used for dyeing or printing shaped structures of cellulose esters or ethers, superpolyamides or superpolyurethanes, and can also be used as pigments.

For some purposes, especially for dyeing "Terylene" fibers, it is especially advantageous to use mixtures of different polyhydroxy-β-acylaminoanthraquinones of this invention. Such mixtures can be obtained either by mixing together the separate unitary products or by carrying out the process of the invention with a mixture of different starting materials. For example, a mixture of different polyhydroxy-β-aminoanthraquinones may be jointly acylated, or a mixture of different acylating agents may be used, for example, a mixture of acetyl chloride and propionic acid chloride or butyric acid chloride, or a mixture of all three of these acid chlorides may be used.

The following examples illustrate the invention, the parts and percentages being by weight:

*Example 1*

12.7 parts of 1:4-dihydroxy-2-aminoanthraquinone are heated in 36 parts of ortho-dichlorobenzene with 6.6 parts of dimethyl-aniline and 4.4 parts of acetyl chloride until the color of the mixture no longer changes from red towards orange. After cooling the reaction mixture the dyestuff is precipitated by the addition of methanol, filtered off and washed with methanol. The dyestuff is then converted into a finely dispersed form by dissolving it in sulfuric acid of 90–95 percent strength at about −10° C., pouring the solution on to ice, filtering off and washing the dyestuff, and then grinding it with a dispersing agent. Alternatively, the dyestuff may be ground with approximately its own weight of an organic solvent, such as pyridine, picoline or dimethylformamide, and then incorporated by grinding into an aqueous solution of a dispersing agent. The dyestuff dyes "Terylene" fibers fast red-orange tints.

By using butyryl chloride as acylating agent, instead of acetyl chloride, a dyestuff is obtained yielding somewhat redder tints.

By using benzoyl chloride, p-toluic acid chloride, hexahydrobenzoyl chloride, or lauryl chloride dyestuffs yielding orange-red tints are obtained.

The 1:4-dihydroxy-2-aminoanthraquinone used as starting material can be obtained as follows:

28.8 parts of 1:4-dihydroxyanthraquinone are heated in 3000 parts of water with 18 parts of hydroxylamine hydrochloride and 66 parts of an aqueous solution of caustic soda of 40 percent strength for 10 hours at 95–100° C. By slightly acidifying the mixture, the 1:4-dihydroxy-2-aminoanthraquinone formed is precipitated, and it is then filtered off.

*Example 2*

14.3 parts of 1:4:5:8-tetrahydroxy-2-aminoanthraquinone are acylated and worked up as described in Example 1. The dyestuff obtained dyes "Terylene" fibers very strong blue-red tints having good properties of fastness. The 1:4:5:8-tetrahydroxy-2-aminoanthraquinone can be obtained as described in the fourth paragraph of Example 1 by reacting 1:4:5:8-tetrahydroxy-anthraquinone with hydroxylamine.

*Example 3*

13.4 parts of 1:4:5-trihydroxy-2- or -3-aminoanthraquinone are acylated with 6 parts of butyryl chloride and worked up as described in Example 1. The dyestuffs so obtained dye polyethylene terephthalate fibers strong scarlet tints having good properties of fastness.

Dyestuffs yielding somewhat redder tints are obtained by using benzoyl chloride, hexahydrobenzoyl chloride, or lauryl chloride.

The 1:4:5-trihydroxy-2- or -3-aminoanthraquinone can be obtained as described in the fourth paragraph of Example 1 by reacting 1:4:5-trihydroxyanthraquinone with hydroxylamine.

*Example 4*

13.4 parts of 1:5:8-trihydroxy-2-aminoanthraquinone are acylated and worked up in the manner described in Example 3. The dyestuff so obtained dyes polyethylene terephthalate fibers strong red-brown tints having good properties of fastness.

The 1:5:8-trihydroxy-2-aminoanthraquinone used as starting material can be obtained by heating 1:2:5:8-tetrahydroxyanthraquinone with ammonia at 130–140° C., and subsequent boiling with dilute sulfuric acid.

*Example 5*

100 parts of a fibrous material of "Terylene" are cleaned for ½ hour in a bath, which contains in 1000 parts of water 1–2 parts of the sodium salt of N-benzyl-$\mu$-heptadecyl-benzimidazole disulfonic acid and 1 part of a concentrated aqueous solution of ammonia. The material is then entered into a dyebath, which has been prepared by dispersing in 3000 parts of water a dyestuff paste obtained as described in Example 1 and containing 1.2 parts of pure dyestuff, with the addition of 4 parts of the sodium salt of N-benzyl-$\mu$-heptadecyl-benzimidazole disulfonic acid. The whole is heated in a pressure vessel at 120° C. and maintained at that temperature for ½ hour. The material is then rinsed well and, if necessary, washed with a solution containing in 1000 parts of water 1 part of the sodium salt of N-benzyl-$\mu$-heptadecyl-benzimidazole disulfonic acid for ½ hour at 60–80° C. A strong red-orange dyeing is obtained.

*Example 6*

100 parts of a fibrous material of "Terylene" are cleaned for ½ hour in a bath which contains in 1000 parts of water 1–2 parts of the sodium salt of N-benzyl-$\mu$-heptadecylbenzimidazole-disulfonic acid and 1 part of a concentrated aqueous solution of ammonia. The material is then preswelled for ½ hour at 80° C. in a bath, which contains in 300 parts of water 15 parts of a mixture of approximately equal parts of ortho-hydroxy-diphenyl, pine oil and Turkey red oil and 15 parts of acetic acid. The bath is then allowed to cool to 50° C., and a dyestuff paste obtained as described in Example 1 is added. The bath is raised to the boil in the course of ½ to ¾ hour and dyeing is carried on for 1–1½ hours at a temperature as close as possible to the boiling point. The material is then rinsed well and, if desired, washed for ½ hour at 60–80° C. with a solution containing in 1000 parts of water 1 part of the sodium salt of N-benzyl-$\mu$-heptadecyl-benzimidazole disulfonic acid. There is obtained a strong red-orange dyeing.

In the following claims the term polyhydroxyanthraquinone means an anthraquinone having at least 2 hydroxy groups.

What is claimed is:

1. A polyhydroxy-acylaminoanthraquinone of the formula

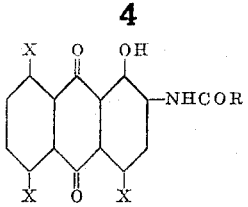

in which at least one X stands for a hydroxy group, the other X's representing hydrogen atoms and —COR represents the radical of a monocarboxylic acid having at least 2 and at most 12 carbon atoms, selected from the group consisting of an aliphatic carboxylic acid, a benzene carboxylic acid, and a hexahydrobenzoic acid.

2. The 1:4-dihydroxy-2-acetylaminoanthraquinone of the formula

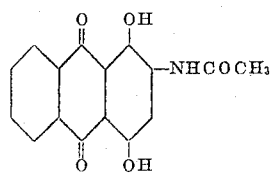

3. The 1:4:5-trihydroxyanthraquinone of the formula

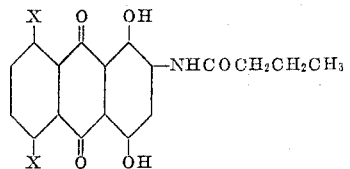

in which one X represents a hydroxy group and the other a hydrogen atom.

4. The 1:4:5-trihydroxyanthraquinone of the formula

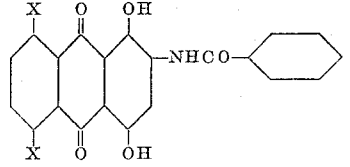

in which one X is a hydroxyl group and the other a hydrogen atom.

5. The 1:4:5-trihydoxyanthraquinone of the formula

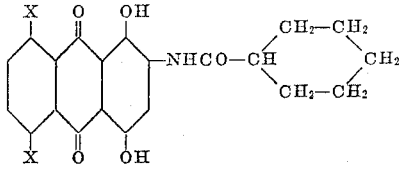

in which one X is a hydroxy group and the other a hydrogen atom.

6. The 1:4:5:8-tetrahydroxy-2-acetylaminoanthraquinone of the formula

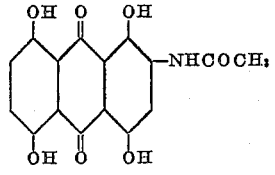

References Cited in the file of this patent

UNITED STATES PATENTS

| | | |
|---|---|---|
| 2,522,034 | Grossmann et al. | Sept. 12, 1950 |
| 2,691,027 | Grossmann et al. | Oct. 5, 1954 |

OTHER REFERENCES

Society of Dyers and Colourists, Colour Index, 1st ed., January 1924, page 270, dye 1130, and page 271, dye 1134.

Beilstein's Handbook of Organic Chemistry, Berlin, 1931, vol. 14, page 267.